United States Patent
Huebner et al.

(10) Patent No.: US 10,876,468 B2
(45) Date of Patent: Dec. 29, 2020

(54) METHOD FOR CONTROLLING A TURBOCHARGING SYSTEM

(71) Applicant: Volkswagen Aktiengesellschaft, Wolfsburg (DE)

(72) Inventors: Matthias Huebner, Braunschweig (DE); Stefan Gebauer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/508,952

(22) Filed: Jul. 11, 2019

(65) Prior Publication Data

US 2020/0018227 A1   Jan. 16, 2020

(30) Foreign Application Priority Data

Jul. 11, 2018 (DE) .......... 10 2018 211 538

(51) Int. Cl.
   *F02B 37/24* (2006.01)
   *F02D 41/00* (2006.01)

(52) U.S. Cl.
   CPC .......... *F02B 37/24* (2013.01); *F02D 41/0007* (2013.01); *F02D 2200/101* (2013.01); *F02D 2200/1002* (2013.01)

(58) Field of Classification Search
   CPC ...... F02B 37/12; F02B 37/24; F02D 41/0007; F02D 41/10; F02D 41/1448;
   (Continued)

(56) References Cited

U.S. PATENT DOCUMENTS

| 5,228,292 A | 7/1993 | Hanauer et al. |
| 6,718,767 B1 * | 4/2004 | Caddy ............... F02B 37/24 60/602 |

(Continued)

FOREIGN PATENT DOCUMENTS

| DE | 102008005121 A1 | 7/2009 |
| DE | 102008018193 B3 | 9/2009 |

(Continued)

*Primary Examiner* — Jesse S Bogue
*Assistant Examiner* — Loren C Edwards
(74) *Attorney, Agent, or Firm* — Muncy, Geissler, Olds & Lowe, P.C.

(57) ABSTRACT

A method for controlling a turbocharging system with a turbocharging stage for an internal combustion engine, wherein the turbocharging stage comprises a compressor and a turbine and the turbine is adjustable via a VTG control. The method includes: acquiring an operating state target variable; adjusting a maximum VTG control criterion to implement the torque increase by increasing a boost pressure, wherein adjusting the maximum VTG control criterion includes: determining a target boost pressure; determining a VTG target position as a function of the target boost pressure; determining an actual exhaust back pressure; determining a maximum exhaust back pressure; determining the VTG control criterion taking into account the difference between the actual exhaust back pressure and the maximum exhaust back pressure. The VTG control criterion limits the VTG target position such that an accelerated adaptation of an actual boost pressure to the target boost pressure) takes place.

14 Claims, 3 Drawing Sheets

(58) Field of Classification Search
CPC ....... F02D 2200/1002; F02D 2200/101; F02D 2250/34
See application file for complete search history.

(56) References Cited

U.S. PATENT DOCUMENTS

| | | |
|---|---|---|
| 8,209,979 B2 | 7/2012 | Wang et al. |
| 9,212,612 B2 * | 12/2015 | Wagner ............... F02D 41/1401 |
| 9,482,147 B2 | 11/2016 | Zhu et al. |
| 2015/0275791 A1 | 10/2015 | Yasui et al. |
| 2017/0335780 A1 | 11/2017 | Dixon et al. |

FOREIGN PATENT DOCUMENTS

| | | |
|---|---|---|
| DE | 102013113645 A1 | 11/2014 |
| DE | 102014208092 A1 | 10/2015 |
| DE | 102014210026 A1 | 11/2015 |
| DE | 102014226771 A1 | 6/2016 |
| DE | 102015214039 A1 | 1/2017 |
| EP | 1178192 A2 | 2/2002 |
| EP | 1302644 A1 | 4/2003 |
| EP | 3078833 A1 | 10/2016 |
| WO | 102008063935 A1 | 6/2010 |
| WO | 102010010362 A1 | 11/2010 |

* cited by examiner

METHOD FOR CONTROLLING A TURBOCHARGING SYSTEM

This nonprovisional application claims priority under 35 U.S.C. § 119(a) to German Patent Application No. 10 2018 211 538.9, which was filed in Germany on Jul. 11, 2018, and which is herein incorporated by reference.

BACKGROUND OF THE INVENTION

Field of the Invention

The present invention relates to a method and a controller for controlling a turbocharging system for an internal combustion engine.

Description of the Background Art

Turbocharging systems for internal combustion engines are generally known, especially in the automotive sector, for increasing the boost pressure in the cylinders of the internal combustion engine, so that more and more highly compressed air is available for the combustion of an increased amount of fuel and thus an increase in the performance of the internal combustion engine (ICE) is achieved.

For example, turbochargers and compressors are known to increase boost pressure. Turbochargers comprise a compressor and they are either equipped with their own drive that is mechanically coupled to the compressor (e.g., an electric motor), or they are mechanically coupled to a turbine that is driven by the exhaust gas of the ICE.

Such exhaust turbochargers are by now the most common solution in the automotive sector to increase the boost pressure. For improved power control, modern exhaust turbochargers are equipped with a bypass valve, also called a "wastegate," and/or with variable turbine geometry, which has adjustable, fixed guide vanes by which the effective flow cross section can be reduced or expanded. The gas flow rate can be varied by adjusting the angle of incidence of the guide vanes. The angle of incidence of the guide vanes is typically regulated or controlled such that at a low gas flow rate and high power requirements, turbocharger performance is increased by reducing the flow cross section and at a high gas flow rate and low power requirements, it is reduced by increasing the flow cross section. This ultimately allows the boost pressure with which the air is pushed into the cylinder for combustion to be increased or decreased. This boost pressure is one of the decisive factors for the internal combustion engine performance potential that can be called up.

A method is known from DE 10 2008 005 121 A1, in which the variable turbine geometry (VTG, adjustable guide vanes) is adjusted such that the turbine provides a predetermined throughput.

It is also known from EP 1 178 192 A2 to control the VTG as a function of other operating parameters of the internal combustion engine (e.g., a diesel engine). Such parameters can be the speed, oil consumption, or the cooling water temperature, or other variables. DE 10 2008 063 935 A1 relates to a method in which values for the boost pressure and the exhaust back pressure, which values are predicted for a transient operating state (positive load step), are compared with corresponding target values and associated damper pulses are calculated which produce an output damper pulse from which an actuation signal (precontrol duty cycle) for adjusting the VTG is determined.

It is also known from DE 10 2014 210 026 A1 to control the turbocharging system as a function of a target boost pressure and a determined boost pressure buildup adjustment. Another method for adapting an actual boost pressure to a target boost pressure by adjusting the turbine geometry (there: rotary blades) is known from DE 10 2008 005 121 A1. This is intended to prevent efficiency scattering.

The problem can exist in the known solutions, however, that the start-up performance is not optimally adjustable. In these known solutions, a turbine control element (wastegate valve and/or VTG) is actuated, whereas only the target state variables are used for the determination portion on the exhaust gas side (before and after the turbine). However, these variables can also be essential for forming the effective engine torque or the available power based on charge cycle losses.

SUMMARY OF THE INVENTION

It is therefore an object of the present invention to provide an improved method for controlling such a turbocharging system and a corresponding controller for controlling such a turbocharging system.

According to an exemplary embodiment, the present invention provides a method for controlling a turbocharging system with a turbocharging stage for an internal combustion engine, wherein the turbocharging stage comprises a compressor and a turbine and the turbine is adjustable by means of a pressure actuator, in particular a VTG actuator, and the method includes: acquiring an operating state target variable ($M_{M\text{-}soll}$); adjusting a maximum VTG control criterion ($u_{max}$) to implement the torque increase by increasing a boost pressure ($p_2$), wherein adjusting the maximum VTG control criterion ($u_{max}$) comprises: determining a target boost pressure ($p_{2soll}$); determining a VTG target position ($u_{soll}$) as a function of the target boost pressure ($p_{2soll}$); determining an actual exhaust back pressure ($p_{3ist}$); determining a maximum exhaust back pressure ($p_{3max}$); determining the VTG control criterion ($u_{max}$) taking into account the difference between the actual exhaust back pressure ($p_3$) and the maximum exhaust back pressure ($p_{3max}$). The VTG control criterion ($u_{max}$) limits the VTG target position ($u_{soll}$) such that an accelerated adaptation of an actual boost pressure ($p_2$) to the target boost pressure ($p_{2soll}$) takes place compared with an adaptation of the actual boost pressure ($p_2$) to the target boost pressure ($p_2$) without consideration of the VTG control criterion ($u_{max}$).

The present invention also provides a controller for a turbocharging system for an internal combustion engine, wherein the controller is configured to carry out the method.

Also, the present invention provides an internal combustion engine having a turbocharging system with a turbocharging stage, wherein the turbocharging stage comprises a compressor and a drive, and with a controller according to the second aspect.

The present invention also provides a motor vehicle having an internal combustion engine according to the third aspect.

As mentioned above, turbocharging systems are known, in particular with an exhaust turbocharger with variable turbine geometry (VTG) and/or with a wastegate (at least one bypass valve). The guide vanes of the exhaust turbocharger can typically be modified at different speeds. This means that the flow velocity is increased rapidly if the boost pressure provided is to be increased significantly, for example, to meet a jump in the power or torque demand (significant acceleration intention) on the internal combustion engine. It turned out in this case that a strong (rapid) drawing together of the guide vanes typically also leads to a high exhaust back pressure and thus to charge cycle losses, which in turn counteracts the effective torque buildup of the internal combustion engine. This relationship can be explained by the fact that the effective engine torque is critical for the driving force on the wheel (and thus the acceleration of a motor vehicle). The effective engine torque corresponds to the difference between the internal engine torque and a loss torque. The loss torque includes charge cycle losses, consumptions by auxiliary units, and friction.

The charge cycle losses are approximately proportional to the scavenging gradient (pressure difference) between the exhaust back pressure on the outlet side and the boost pressure on the inlet side of the unit. This was determined by considering a cycle process of a real internal combustion engine.

In order to increase the effective engine torque or the vehicle acceleration, two components are available that can be influenced by adjusting the VTG position: a faster or higher boost pressure buildup can be realized on the fresh air side (with the supply of fresh air in the cylinders). Thus, an increased injection quantity of fuel can be released at an earlier point in time. This leads to a faster or higher buildup of the internal torque (torque due to combustion in the cylinder); and/or on the exhaust side, the charge cycle losses are to be reduced or influenced in that the course of the VTG position also determines the course of the exhaust back pressure (e.g., by a lower buildup of the exhaust back pressure).

Surprisingly, it has been shown that a long and greater closing of the VTG (reduction of the minimum cross-sectional area, i.e., reduced so-called minflow) indeed causes a greater or faster buildup of the exhaust back pressure. However, the influence on the boost pressure course (fresh air side) and the vehicle acceleration is relatively low. This indicates that the energy of the exhaust back pressure buildup can be converted only to a very limited extent into an increased turbocharger speed and thus an increased boost pressure buildup. This is due to the turbocharger efficiency characteristics. The approach taken in this invention is to limit the loss torque, namely by limiting the exhaust back pressure. This optimizes the boost pressure buildup and thus increases the effective torque more quickly.

The adjustment of the invention of the exhaust turbocharger geometry (VTG) to limit the exhaust back pressure partially reduces the unusable enthalpy before the turbine. This effect is particularly noticeable when an exhaust turbocharger with reduced minimum mass flow (minflow) is used. By reducing the enthalpy, the boost pressure buildup is realized more quickly at the same time. Limiting the exhaust back pressure promotes at least two desired effects, for example: faster boost pressure buildup and thus a faster buildup of the internal engine torque (due to a higher injection quantity) and lower charge cycle losses due to the limiting of the exhaust back pressure.

This increases the effective torque and the vehicle's wheel acceleration torque, which is essential for the acceleration, compared with conventional drive functionalities.

This is achieved by first acquiring an operating state target variable, which can be, e.g., a target torque or else a so-called driver's request (full load request), which is transmitted to a vehicle control system by actuating the accelerator pedal. An increase in the boost pressure to implement a desired torque increase is realized by adjusting a control criterion of the adjustable turbine geometry (VTG control criterion).

The terms control, adjustment, actuation, controller, and regulation in the context of this invention can comprise both controls in the true sense (without feedback) and regulations (with one or more control loops).

The steps for adjusting or regulating the exhaust back pressure by means of this maximum VTG control criterion comprise in particular the following:

First, a target boost pressure is determined (for example, from a characteristic map), which is suitable or optimized for the desired acceleration, the desired (full) load state, or the desired torque increase. Depending on this, a VTG target position can be determined, but when it is adjusted, a too high exhaust back pressure can lead to the unwanted enthalpy accumulation before the turbine. To limit this target position, the following is therefore provided:

Determining (by measurement, modeling, calculation, etc.) an actual exhaust back pressure and determining a maximum exhaust back pressure. The difference between the actual exhaust back pressure and the maximum exhaust back pressure is taken into account to determine the VTG control criterion. On this basis, a maximum VTG control criterion is determined which limits the already existing VTG target position such that an accelerated adaptation of the boost pressure to the target boost pressure takes place compared with an adaptation of the actual boost pressure to the target boost pressure without taking into account the maximum VTG control criterion. Thus, the undesirable enthalpy accumulation described above before the turbine can be prevented by a suitable adjustment of the exhaust back pressure. By limiting the exhaust back pressure via the determination of a suitable maximum VTG control criterion, apart from an effective torque optimization, a uniform limitation of the exhaust back pressure is also possible, which serves to reduce component scatter of exhaust turbochargers with respect to their minimum flow values. Limiting the exhaust back pressure also serves to protect components behind or in the exhaust manifold.

Because the exhaust back pressure also influences the scavenging gradient in the cylinder, the residual gas content in the cylinder can also be adjusted in this way. Thus, the emissions of diesel engines can be positively influenced. In gasoline engines, the combustion conditions can be ensured by limiting the residual gas content in the cylinder. In particular, however, such a refined, smooth, but nevertheless more rapid torque buildup can be realized. A torque jerk or torque jumps, which can occur due to a sudden transfer of accumulated exhaust gas enthalpy to the turbine wheel, are avoided.

The determination of the maximum exhaust back pressure can further comprise the following: parameterizing a first maximum exhaust back pressure taking into account an operating state variable (e.g., engine speed) and an operating state target variable (e.g., target engine torque) and an ambient pressure, and parameterizing a second maximum exhaust back pressure taking into account the operating state variable and the difference between the target boost pressure and the actual boost pressure. The maximum exhaust back pressure is then established as the minimum of the first maximum exhaust back pressure and the second maximum exhaust back pressure. The special feature in the parameterization of the second maximum exhaust back pressure is that a boost pressure actual value is added to the respective parameterized value, which was determined as a function of the difference between the target boost pressure and the actual boost pressure and of the operating state variable.

The actual boost pressure and/or the actual exhaust back pressure can be determined by means of a sensor or, alternatively, are a modeled value which can be modeled or calculated from the respective operating state variables or is stored in suitable characteristic maps.

The parameterization of the second maximum exhaust back pressure can take place with consideration of a scavenging gradient, an allowable scavenging gradient can also be maintained when adjusting the maximum exhaust back pressure.

The scavenging gradient can be determined by means of a characteristic map. This allows a particularly simple operating state-dependent determination of the scavenging gradient.

The adjusting quality, in particular the control quality, can be improved further by a method in which the determination of the VTG control criterion takes place with consideration of a maximum exhaust back pressure change. Thus, the adjustment speed of the exhaust back pressure to be adjusted is also taken into account, so that its adaptation can be optimized.

The method can be refined further in the case of a method in which the maximum exhaust back pressure change is determined from a parameterization of the operating state variable, in particular a speed and the operating state target variable, in particular of a target torque or load state, and this is then weighted according to the difference between the actual exhaust back pressure and the maximum exhaust back pressure.

A further example is realized by taking into account a correction factor, which is parameterized from the difference between the actual exhaust back pressure and the maximum exhaust back pressure (e.g., via a characteristic map, modeling, or a calculation rule), for determining the maximum exhaust back pressure change.

Thus, the adjustment, which can be done in particular via a proportional controller (P controller), can be equipped with a so-called gain scheduling. This enables a parameterization in which the gain and the associated adjustment speed of the closed control loop are adjusted as a function of the target engine torque (operating state target variable) and the engine speed (operating state variable). A weighting is performed with the corresponding control deviation (the difference between the maximum allowable exhaust back pressure and the actual exhaust back pressure). This procedure is also called "gain scheduling."

A reliable determination of the VTG control criterion is carried out with consideration of the relationship $$u_{max} = \Delta u_{p3Ctl\,max} + \Delta u_{p4} + \Delta u_T + \Delta u_{\dot{m}} + r_{vtg}$$

for which the following applies $$\Delta u_{p3Ctl\,max} = \alpha \cdot \dot{p}3_{max} = \alpha \cdot K_p \cdot (p_{3max} - p_3)$$

$$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \ddot{m}$$

with $$\alpha = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)}$$

This allows an input/output linearization to be realized, which allows the VTG control criterion to be determined from the maximum allowable change in the exhaust back pressure over time with the aid of fed-back controlled system state variables (such as, e.g., the temperatures $T_1$, $T_2$ before and after the turbocharger, the temperatures $T_3$, $T_4$ before and after the turbine, the actual pressures $p_3$, $p_4$ before and after the turbine, the actual VTG position).

The derivation of the calculation relationships given above is as follows:

To derive the control law, the throttle equation (Equation 1) is used to describe the exhaust back pressure $p_3$ according to [1] Schollmeyer, *Beitrag zur modellbasierten Ladedruckregelung für Pkw-Dieselmotoren* [*Contribution to the Model-based Boost Pressure Control for Passenger Car Diesel Engines*] and the method of input/output linearization (I/O linearization) according to [2] Isidori, *Nonlinear Control Systems*, 1995.

$$p_3 = -\frac{(6c_d^2 - 2c_{dK})p_4}{2(2c_{dK} - 3c_d^2)} \pm \sqrt{\left(\frac{(6c_d^2 - 2c_{dK})p_4}{2(2c_{dK} - 3c_d^2)}\right)^2 + \frac{3c_d^2 p_4^2 A_{eff}^2 + \dot{m}^2 R_s \cdot T_{3K}}{A_{eff}^2 (2c_{dK} - 3c_d^2)}} \quad (1)$$

The exhaust back pressure $p_3$ depends on the variables: flow factor $c_d$, effective area $A_{eff}$, temperature before the turbine $T_3$, turbine mass flow $\dot{m}$, as well as the pressure after the turbine $p_4$, which in turn depend on time and are available in the control unit as model or sensor variables. The case distinction of the root term takes place according to [1] based on the criterion $\xi = 2c_{dK} - 3c_d^2$. If $\xi$ assumes positive values, the root term is added; if it is negative, it is subtracted.

The variables $A_{eff}$ and $c_d$ each depend nonlinearly on the actuator position $r_{vtg}$, so that it is not formally possible to reach an actuator position for an exhaust back pressure without using a search or optimization method. This problem can be solved by applying I/O linearization.

As the scheme of I/O linearization dictates, this equation for $p_3$ is now derived with respect to time until the control variable $r_{vtg}$ (VTG position) is input affine.

For this purpose, the (position-controlled) actuator behavior of the variable turbine geometry (VTG) is additionally modeled as PT1 behavior according to Equation 2.

$$\tau \cdot \dot{r} = u - r_{vtg} \quad (2)$$

The variable u here is the desired actuator position of the VTG.

Equation 3, which includes the temporal control variable change $\dot{r}$, results for the first time derivative of the exhaust back pressure $\dot{p}_3$.

$$\dot{p}_3 = \left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right) \cdot \dot{r} + \frac{\partial p_3}{\partial p_4} \cdot \dot{p}_4 + \frac{\partial p_3}{\partial T_3} \cdot \dot{T}_3 + \frac{\partial p_3}{\partial \dot{m}} \ddot{m} \quad (3)$$

Now $\dot{r}$ from Equation 2 can be used in Equation 3, so that Equation 4 results. It can be seen that a temporal change in the exhaust back pressure can be assigned a necessary actuator position. As part of limitation control, these variables are to be interpreted as the allowable maximum change in the exhaust back pressure, which corresponds to a allowable maximum target VTG position.

$$\dot{p}_3 = \left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right) \cdot \frac{1}{\tau}\left(u - r_{Vtg} + \frac{\partial p_3}{\partial p_4}\right) \cdot \dot{p}_4 + \quad (4)$$

$$\frac{\partial p_3}{\partial T_3} \cdot \dot{T}_3 + \frac{\partial p_3}{\partial \dot{m}} \ddot{m}$$

It becomes clear that the desired control variable u in the first derivative of $p_3$ is linear; the differential order is $\delta=1$ and it is not necessary to form further time derivatives of the $p_3$ state equation. By the differentiations, the control components of $c_d$ and $A_{eff}$ can be summed to form a jointly effective control component.

From Equation 4, if there are partial derivatives, the required (in the present case, maximum) control variable u for a (here maximum allowable) exhaust back pressure change $\dot{p}_3$ can be determined by simple term transformation, which results in Equation 5. As previously described, $\dot{p}_3$ corresponds to the output variable of the higher-order P controller, so that the following results as the control law:

$$u = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)} \quad (5)$$

$$\left(\dot{p}_3 - \frac{\partial p_3}{\partial p_4} \cdot \dot{p}_4 - \frac{\partial p_3}{\partial T_3} \cdot \dot{T}_3 - \frac{\partial p_3}{\partial \dot{m}} \ddot{m}\right) + r_{Vtg}$$

If this equation is interpreted under the present objective of limitation control, then the relevant variables $\dot{p}_3$ and u are provided with max subscripts. In addition, by multiplying out each state derivative, a position change component $\Delta u$ can be defined as a deviation from the actual position $r_{vtg}$, whereby interfering components and their influence on positional changes can be identified more transparently than in classical control approaches. Thus, the compact representation results from Equation 6.

$$u_{max} = \Delta u_{p3Ctl\,max} + \Delta u_{p4} + \Delta u_T + \Delta u_{\dot{m}} + r_{vtg} \quad (6)$$

This is followed by the assignment of the $\Delta u$ variables according to Equation Set 7, with the simultaneous use of a proportional controller (with its gain $K_p$) in the feedback of the actual exhaust back pressure $p_3$.

$$\Delta u_{p3Ctlmax} = \alpha \cdot \dot{p}_{3max} = \alpha \cdot K_p \cdot (p_{3max} - p_3) \quad (7)$$

$$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \ddot{m}$$

with $$\alpha = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)}$$

Finally, the control loop is closed by using the P controller to form the maximum allowable exhaust back pressure change. The time derivatives of the other state variables can be obtained either via an approximate calculation using differential quotients and their filtering or the use of DT1 elements, or by the calculation of first-order state differential equations in each time step in the context of a state observer. The use of DT1 elements, which are supplied by the state variables available in the control unit, has proven to be practicable in this specific application and sufficient for approximating the time derivatives of the state variables.

For the sake of completeness, the partial derivatives are shown below which are calculated in each time step from the time-variant state variables available in the control unit.

Partial derivatives of the stationary $p_3$ equation

Stationary state equation of the exhaust back pressure $$p_3 = -\frac{(6c_d^2 - 2c_{dK})p_4}{2(2c_{dK} - 3c_d^2)} \pm \sqrt{\left(\frac{(6c_d^2 - 2c_{dK})p_4}{2(2c_{dK} - 3c_d^2)}\right)^2 + \frac{3c_d^2 p_4^2 A_{eff}^2 + \dot{m}^2 R_s \cdot T_{3K}}{A_{eff}^2(2c_{dK} - 3c_d^2)}}$$

Partial Derivatives

Whether the positive or the negative root term is to be chosen depends on the term $\xi := 2c_{dK} - 3c_d^2$. If $\xi$ is positive, the root term is added; if $\xi$ is negative, the root term is subtracted. Accordingly, a case distinction will be made below in each case.

Partial derivative with respect to $r_{vtg}$ $$\frac{\partial p_3}{\partial r_{Vtg}} = \frac{\partial p_3}{\partial A_{eff}} \cdot \frac{\partial A_{eff}}{\partial r_{Vtg}} + \frac{\partial p_3}{\partial c_d} \cdot \frac{\partial c_d}{\partial r_{Vtg}} \frac{[hPa]}{[\%]}$$

$$\frac{\partial p_3}{\partial A_{eff}} = \pm \frac{3\frac{c_d^2 p_4^2}{A_{eff}(2c_{dK} - 3c_d^2)} - \frac{3c_d^2 p_4^2 A_{eff}^2 + \dot{m}^2 R_s \cdot T_{3K}}{A_{eff}^3(2c_{dK} - 3c_d^2)}}{\sqrt{\frac{(6c_d^2 - 2c_{dK})^2 p_4^2}{(4c_{dK} - 6c_d^2)^2} + \frac{3c_d^2 p_4^2 A_{eff}^2 + \dot{m}^2 R_s \cdot T_{3K}}{A_{eff}^2(2c_{dK} - 3c_d^2)}}}$$

$$\frac{\partial p_3}{\partial c_d} = \frac{(-12c_d + 2_K)p_4}{(4c_{dK} - 6c_d^2)} - \frac{(-6c_d^2 + 2c_{dK})p_4(4K - 12c_d)}{(4c_{dK} - 6c_d^2)^2} \pm \ldots$$

$$\ldots \pm \frac{\left(2\frac{(6c_d^2 - 2c_{dK})p_4^2(12c_d - 2_K)}{(4c_{dK} - 6c_d^2)^2} - 2\frac{(6c_d^2 - 2c_{dK})^2 p_4^2(4_K - 12c_d)}{(4c_{dK} - 6c_d^2)^3} + \frac{6c_d p_4^2}{2c_{dK} - 3c_d^2} - \frac{(3c_d^2 p_4^2 A_{eff}^2 + \dot{m}R_S T_{3K})(2_K - 6c_d)}{A_{eff}^2(2c_{dK} - 3c_d^2)^2}\right)}{2 \cdot \sqrt{\frac{(6c_d^2 - 2c_{dK})^2 p_4^2}{(4c_{dK} - 6c_d^2)^2} + \frac{3c_d^2 p_4^2 A_{eff}^2 + \dot{m}^2 R_S T_{3K}}{A_{eff}^2(2c_{dK} - 3c_d^2)}}}$$

Partial derivative with respect to $p_4$ $$\frac{\partial p_3}{\partial p_4} = \frac{-6c_d^2 + 2c_{dK}}{4c_{dK} - 6c_d^2} \pm \frac{\left(\frac{(6c_d^2 - 2c_{dK})^2 p_4}{(4c_{dK} - 6c_d^2)^2} + 3\frac{c_d^2 p_4}{2c_{dK} - 3c_d^2}\right)}{\sqrt{\frac{(6c_d^2 - 2c_{dK})^2 p_4^2}{(4c_{dK} - 6c_d^2)^2} + \frac{3c_d^2 p_4^2 A_{eff}^2 + \dot{m}R_S T_{3K}}{A_{eff}^2(2c_{dK} - 3c_d^2)}}}$$

Partial derivative with respect to $T_3$ $$\frac{\partial p_3}{\partial T_3} = \pm \frac{\dot{m}^2 R_{sK}}{2 \cdot \sqrt{\frac{(6c_d^2 - 2c_{dK})^2 p_4^2}{(4c_{dK} - 6c_d^2)^2} + \frac{3c_d^2 p_4^2 A_{eff}^2 + \dot{m}R_S T_{3K}}{A_{eff}^2(2c_{dK} - 3c_d^2)}} A_{eff}^2(2c_{dk} - 3c_d^2)}$$

Partial derivative with respect to $\dot{m}$ $$\frac{\partial p_3}{\partial \dot{m}} = \pm \frac{\dot{m}^2 R_s T_{3K}}{\sqrt{\frac{(6c_d^2 - 2c_{dK})^2 p_4^2}{(4c_{dK} - 6c_d^2)^2} + \frac{3c_d^2 p_4^2 A_{\it{eff}}^2 + \dot{m} R_s T_{3K}}{A_{\it{eff}}^2 (2c_{dK} - 3c_d^2)}} A_{\it{eff}}^2 (2c_{dK} - 3c_d^2)}$$

In a method in which the operating state variable is an engine speed and the operating state variable is a target engine torque, the desired adjustments/regulations can be carried out with state variables that are particularly easy to determine or derive.

In a method in which the exhaust back pressure is determined via an input/output linearization which is realized by control technology and takes into account in particular the following variables (such as, e.g., the temperatures $T_4$ after the turbine, the actual pressure $p_3$ before the turbine; the exhaust mass flow $\dot{m}$) (in which these variables are fed back), exogenous influencing variables can be taken into account in model portions of the controls and disturbances due to changing environmental conditions such as ambient temperature and ambient pressure can be easily compensated.

As a result, the application effort can be reduced compared with other solutions. Furthermore, the nonlinearity of the turbine-side choke point is nominally compensated, so that the parameterization can be realized by means of a simple P controller. The nonlinearity of the controlled system is compensated with this linearization part or linearization method.

As shown above, the state equation of the temporal exhaust back pressure change until the relative degree or the control variable is reached is derived for the linearization, so that a model inverse can be formed in which the VTG control criterion (the maximum allowable VTG position) is determined as a function of a maximum allowable change in the exhaust back pressure. In conjunction with a linear P controller, which calculates or evaluates the control deviation between the parameterizable maximum exhaust back pressure and an actual model or measured value of the exhaust back pressure and thus outputs the maximum allowable change in the exhaust back pressure over time per time step, a linear first-order delay behavior results for the limited case with constant parameterization of the P controller.

A controller for a turbocharging system for an internal combustion engine is also provided, wherein the controller is configured to execute the method described above. The controller can have a processor and a memory in which the method and corresponding characteristic curves, characteristic maps, models, computer programs, or the like are stored. The controller can be designed, for example, as an engine control unit.

An internal combustion engine having a turbocharging system and a controller as described above is also provided.

A motor vehicle having such an internal combustion engine is also provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
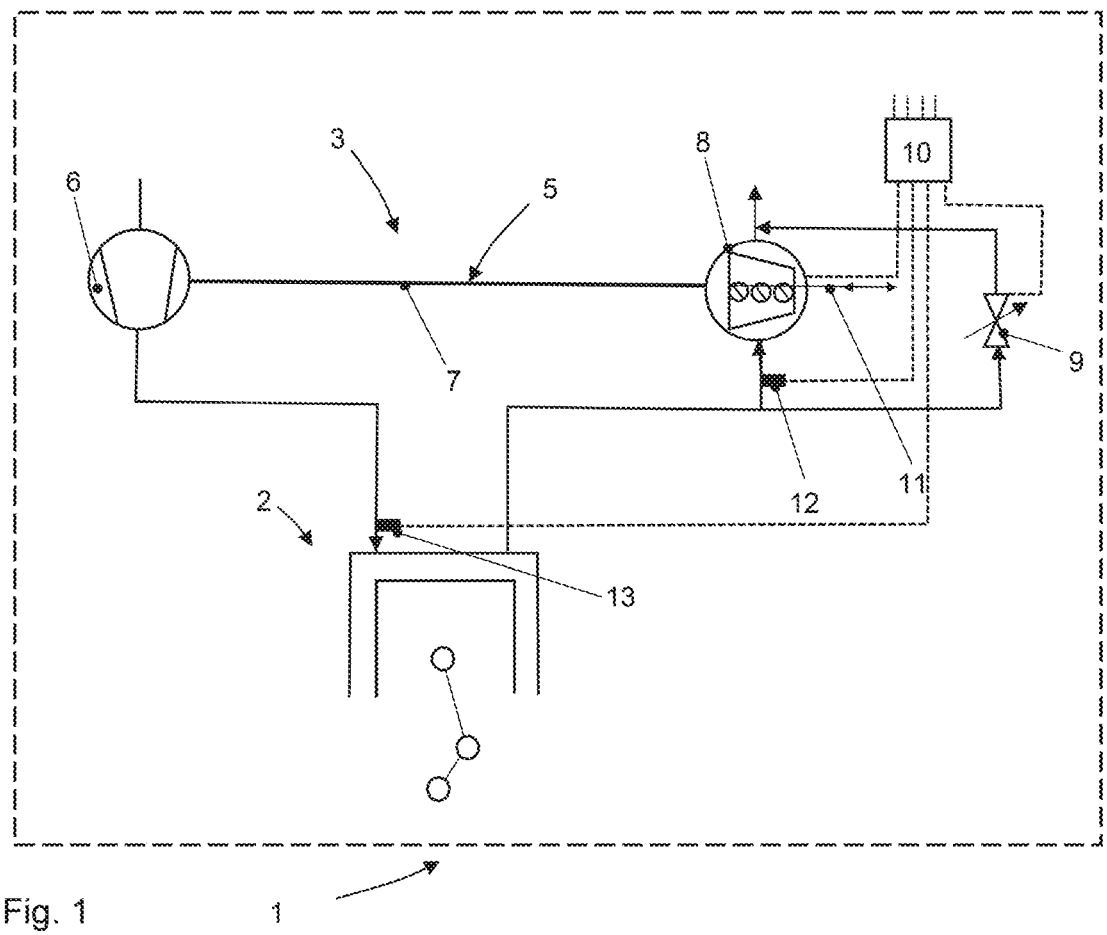
FIG. 1 schematically shows an exemplary embodiment of a motor vehicle with a charging system and a controller.

An exemplary embodiment of a motor vehicle 1 having an engine 2 and a turbocharging system 3, which is controlled by a controller 10, which is designed as an engine control unit, is illustrated in FIG. 1.

The present invention is not limited to a particular type of engine. It can be an internal combustion engine designed, for example, as a gasoline engine or as a diesel engine.

Engine 2 comprises one or more cylinders 4, one of which is shown here. Cylinders 4 are supplied by turbocharging system 3 with charged (combustion) air.

Turbocharging system 3 has a turbocharging stage with variable turbine geometry. Turbocharging stage 5 is coupled to controller 10.

Turbocharging stage 5 has a compressor 6, which is operated via a shaft 7 with a turbine (exhaust gas turbine) 8 with variable turbine geometry (VTG), wherein turbine 8 is supplied with exhaust gas from engine 2 and driven therewith. In addition, a wastegate 9 is optionally provided. Optionally, a multi-stage turbocharged unit can also be provided.

During operation, ambient air at ambient pressure $p_1$ and ambient temperature $T_1$ is fed through compressor 6, compressed, and is fed into cylinder 4 at the boost pressure $p_2$ and boost temperature $T_2$. The exhaust gases are fed into the turbine with the exhaust back pressure $p_3$ and the exhaust gas temperature $T_3$ and exit there with the post-turbine temperature $T_4$ and post-turbine pressure $p_4$. The controller is connected to wastegate 9 and to a mechanism 11 for adjusting the variable turbine geometry, and optionally to a sensor 12 with which the exhaust gas temperature $T_3$ or the exhaust back pressure $p_3$ can be measured. Optionally, a further sensor 13 is provided, with which the boost pressure $p_2$ and the air temperature $T_2$ can be measured downstream of compressor 6. The controller is equipped with additional sensor inputs and signal outputs for receiving and processing operating state variables and for outputting actuation and control signals. These include, e.g., the temperature and pressure values given above, which are either determined or modeled via sensors or via operating state variables or can also be determined via characteristic maps.

Figure 2:
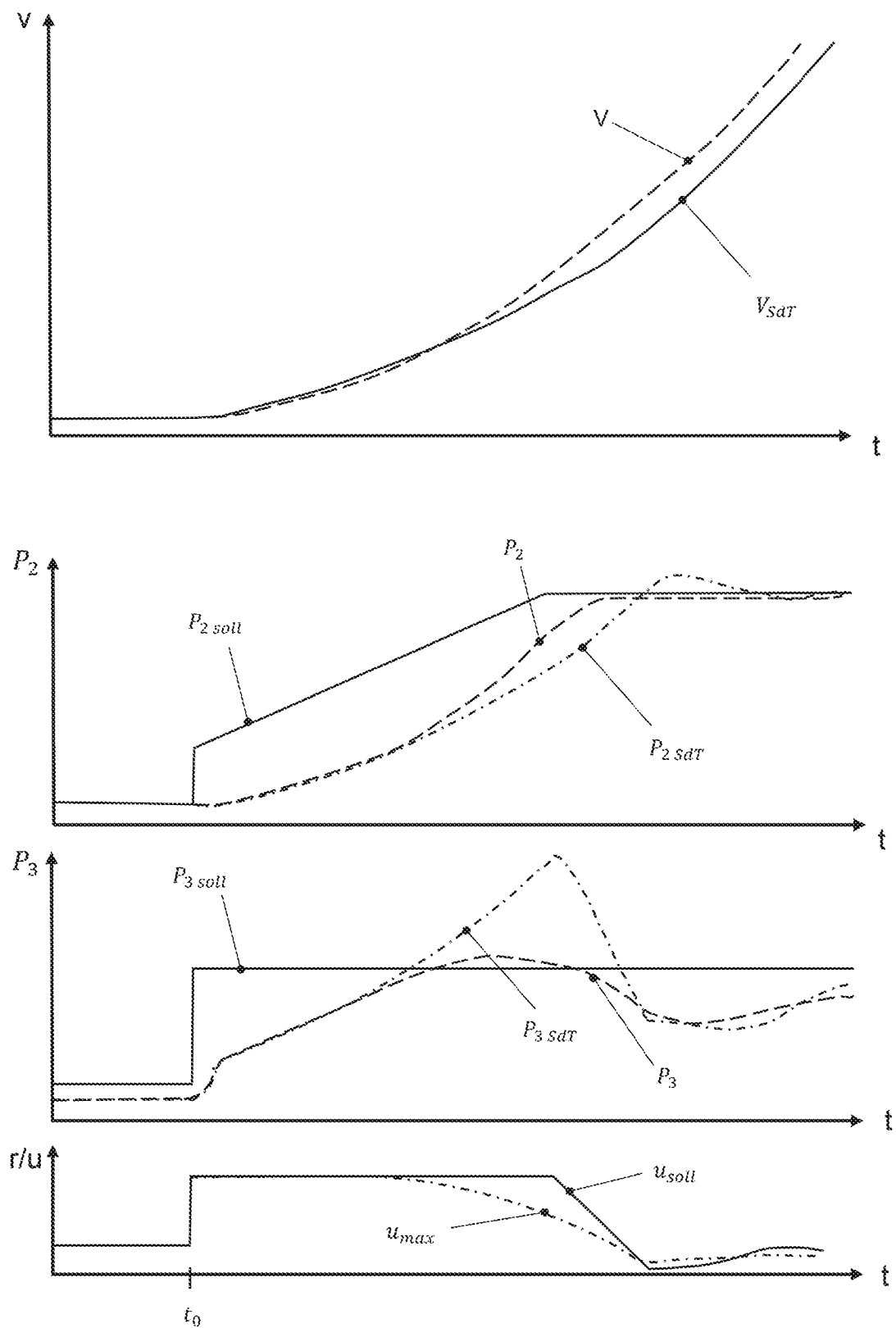
FIG. 2 shows diagrams depicting speed curves, boost pressure curves, back pressure curves, and position curves of the exhaust gas turbine geometry over time, and the difference between the method of the invention and conventional methods.

FIG. 2 shows several diagrams one above the other, in which certain control and state variables are plotted over time.

The vehicle speed v is plotted over time in the upper diagram. The solid line designates a speed curve $V_{SdT}$ without application of the method of the invention and the dashed line shows the speed curve v for a vehicle in which the method of the invention was used.

The vehicle speed and the acceleration depend on the boost pressure curve $p_2$ provided below. At a time $t_0$, for example, an acceleration request (e.g., full load request) is transmitted to controller 10 by actuating the gas pedal, which then determines a target boost pressure (solid line) or a target boost pressure curve $p_{2soll}$, which leads to the desired boost pressure increase and thus to the desired acceleration. The dot-dashed line designates a boost pressure curve, which results in a conventional boost pressure control ($p_{2SdT}$). The dashed line shows a boost pressure curve $p_2$, which results when the method of the invention is used. This curve is closer to the curve of the target boost pressure and therefore also leads to the improved acceleration or the increased speed in the diagram above.

The course of the exhaust back pressure $p_3$ is plotted over time in the diagram below this. The continuous ramp curve shows the course of the theoretical maximum exhaust back pressure $p_{soll}$, which should be adjusted in order to adjust an optimal adjustment of the boost pressure and thereby the acceleration. The dot-dashed line shows the actual course of the exhaust back pressure $p_{3SdT}$ without the use of the method of the invention. The dashed line shows the course of the actual exhaust back pressure $p_3$ using the method of the invention, which sets an exhaust back pressure limit that adjusts the actual exhaust back pressure close to the target exhaust back pressure $p_{soll}$. In this diagram, an "enthalpy accumulation" is recognizable in the area of the conventional exhaust back pressure curve and the exhaust back pressure curve of the invention, which leads to the desired boost pressure being built up with a delay by the unused enthalpy and overshooting the target boost pressure.

The position r of the turbocharger geometry is shown in the bottom diagram. The solid line designates the curve $u_{soll}$ of the adjustable turbine geometry without consideration of an exhaust back pressure limit. The dot-dashed curve is determined with consideration of an exhaust back pressure limit and represents the curve of the control criterion $u_{max}$ of the invention of the adjustable turbocharger geometry. This runs below the curve of the target position $u_{soll}$ and thus prevents the overshooting of the exhaust back pressure curve in the diagram above.

The method of the invention will be explained further with reference to FIGS. 2 and 3 to 5.

Figure 3:
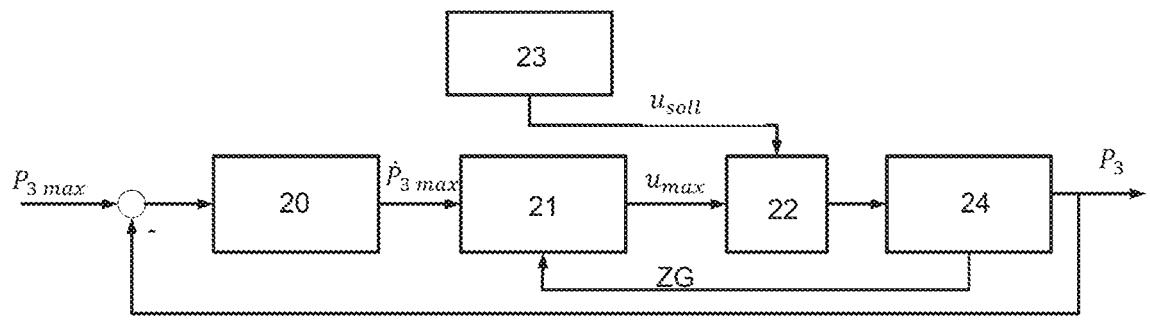
FIG. 3 is a schematic representation of an exhaust back pressure limiting control of the invention.

FIG. 3 shows a control loop which, taking into account a maximum exhaust back pressure $p_{3max}$ (see below), adjusts an actual exhaust back pressure $p_3$, which realizes an optimized boost pressure course $p_2$. The difference between the maximum exhaust back pressure $p_{3max}$ and the exhaust back pressure $p_3$ is fed to a closed-loop controller 20 (P controller), which forwards a maximum exhaust back pressure change $\dot{p}_{3max}$ to a linearization block 21. The linearization part determines a maximum VTG control criterion $u_{max}$, which is fed to a limiting section 22, taking into account further state variables ZG (such as, e.g., the temperature $T_3$ before the turbine, the actual pressures $p_3$, $p_4$ before and after the turbine, as well as the exhaust gas (turbine) mass flow $\dot{m}$). In limiting section 22, the VTG control criterion $u_{max}$ is compared with a regular VTG position $u_{soll}$, which is supplied from a conventional boost pressure control section 23. The VTG control criterion $u_{max}$ limits the VTG target position $u_{soll}$ such that the exhaust back pressure $p_3$ is adjusted close to the desired target exhaust back pressure $p_{3soll}$ via the adjustable turbine geometry or adjustment mechanism 11 (VTG) and/or, if appropriate, also via wastegate 9. Mechanism 11 of the adjustable turbine geometry, which can be addressed via controller 10, corresponds thereby to controlled system 24 in FIG. 2.

FIG. 3 schematically shows the determination of the maximum allowable exhaust back pressure $p_{3max}$. In the top branch, a pressure variable is parameterized from the engine speed n and a target engine torque $M_{m-soll}$ (with the aid of a characteristic map or another modeling or calculation method), to which the ambient pressure $p_1$ is added. The pressure variable and the added ambient pressure $p_1$ result in a first maximum exhaust back pressure $p_{3max1}$. In the bottom branch, a second maximum exhaust back pressure $p_{3max2}$ is parameterized (also via a characteristic map or another suitable modeling or calculation), taking into account the difference between the boost pressure $p_2$ and the target boost pressure, as well as the engine speed n. In this case, the desired maximum exhaust back pressure $p_3$ results from the minimum of the two variables, the first maximum exhaust back pressure $p_{3max1}$ and second maximum exhaust back pressure $p_{3max2}$, which are selected in block 25. For the pressure variable parameterized in the bottom branch, the allowable maximum pressure difference (scavenging gradient) between the exhaust back pressure $p_3$ and boost pressure $p_2$ is taken into account. This ensures that the subsequent exhaust back pressure limit regulation according to FIG. 2 also considers the adherence to the adjusted allowable scavenging gradient.

Figure 4:
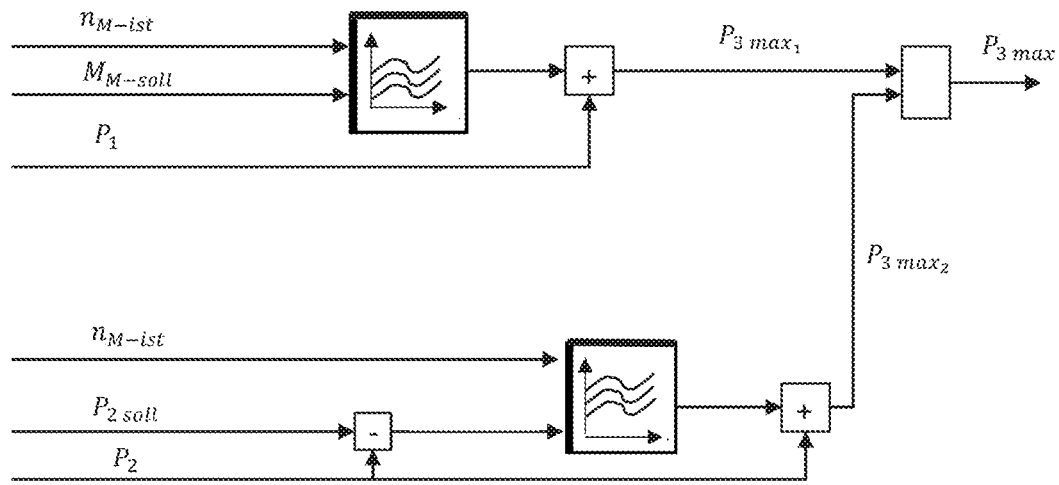
FIG. 4 is a schematic representation for determining a maximum allowable exhaust back pressure according to the method of the invention.
Figure 5:
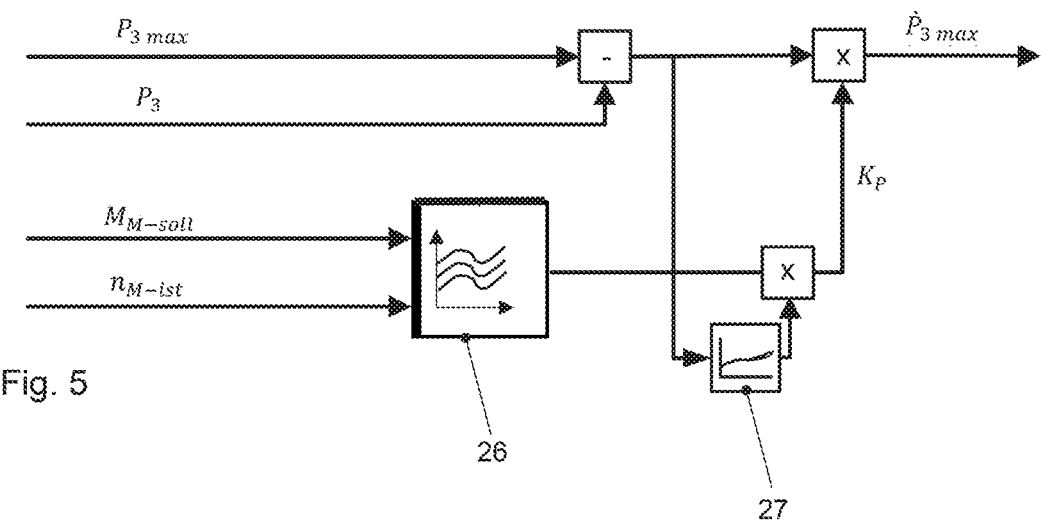
FIG. 5 is a schematic representation of the control with consideration of a gain scheduling approach.

FIG. 4 shows a functional element of closed-loop controller 20 shown in FIG. 3, which is designed as a proportional controller (P controller). FIG. 5 shows a so-called "gain scheduling" component, which outputs a maximum allowable change over time in the exhaust back pressure ($\dot{p}_{3max}$). For this purpose, the difference between the maximum allowable exhaust gas pressure $p_{3max}$ and the exhaust back pressure $p_3$ (actual exhaust back pressure) is taken into account and in EP component 26 a value is parameterized from the engine target torque $M_{m-soll}$ and the engine speed $N_{M-ist}$ and multiplied by a correction value determined in a control deviation correction block 27. The control deviation correction is parameterized from the difference between the maximum allowable back pressure $p_{3max}$ and the back pressure $p_3$ and results in a control amplification $K_p$, which together with the difference between the maximum allowable exhaust back pressure $p_{3max}$ and the actual exhaust back pressure $p_3$ results in a maximum allowable change of the exhaust back pressure $\dot{p}_{3max}$. The VTG control criterion $u_{max}$ is then determined in linearization part 21 from this maximum allowable change over time in the exhaust back pressure $\dot{p}_{3max}$. This linearization is carried out according to the mathematical methodology given above.

As an alternative to the embodiment described above, methods are also possible in which the limiting of the VTG control criterion or the VTG position is regulated. In this case, the VTG position can be adjusted to a regular actuation value of the VTG target position on reaching a parameterized exhaust back pressure or after a certain time after a load change request (e.g., a full load request) and defined opening of the VTG position with a parameterizable ramp gradient as a function of load and speed.

A simplified regulation with a classic structure can also be realized. In this case, a stationary pilot control and a parallel linear controller, whose control components are added, can be used. However, no dynamic amplification effects are considered in the model inverse. The pilot control can be realized as a model inverse or as a characteristic map with free parameterization (e.g., speed and load).

Other mathematical methods can also be used to solve the equation for the maximum exhaust back pressure ($p_{3max}$) according to the VTG control criterion $u_{max}$ (maximum allowable VTG position). Iterative solution methods, e.g., are also suitable in this case.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a turbocharging system with a turbocharging stage for an internal combustion engine, the turbocharging stage comprising a compressor and a turbine adjustable via a VTG actuator, the method comprising:
    acquiring an operating state target variable; and
    adjusting a maximum VTG control criterion to implement a torque increase by increasing a boost pressure, wherein adjusting the maximum VTG control criterion comprises:
        determining a target boost pressure;
        determining a VTG target position as a function of the target boost pressure;
        determining an actual exhaust back pressure;
        determining a maximum exhaust back pressure; and
        determining the VTG control criterion taking into account a difference between the actual exhaust back pressure and the maximum exhaust back pressure, where the difference is determined by subtracting the actual exhaust back pressure from the maximum exhaust back pressure,
    wherein the VTG control criterion limits the VTG target position such that an accelerated adaptation of an actual boost pressure to the target boost pressure takes place compared with an adaptation of the actual boost pressure to the target boost pressure without consideration of the VTG control criterion, and
    wherein the determination of the maximum exhaust back pressure comprises:
        parameterizing a first maximum exhaust back pressure taking into account an operating state variable, the operating state target variable, and an ambient pressure;
        parameterizing a second maximum exhaust back pressure taking into account the operating state variable and the difference between the target boost pressure and the actual boost pressure; and
        establishing the maximum exhaust back pressure as a minimum of the first maximum exhaust back pressure and the second maximum exhaust back pressure.

2. The method according to claim 1, wherein the actual boost pressure and/or the actual exhaust back pressure are determined via a sensor.

3. The method according to claim 1, wherein the actual boost pressure and/or the actual exhaust back pressure are a modeled value.

4. The method according to claim 1, wherein the parameterization of the second maximum exhaust back pressure takes place with consideration of a scavenging gradient.

5. The method according to claim 4, wherein the scavenging gradient is determined via a characteristic map.

6. The method according to claim 1, wherein the VTG control criterion is determined with consideration of a maximum exhaust back pressure change.

7. The method according to claim 1, wherein the operating state variable is an engine speed and the operating state target variable is a target engine torque.

8. A controller for the turbocharging system for the internal combustion engine, wherein the controller is configured to carry out the method according to claim 1.

9. The internal combustion engine comprising the turbocharging system with the turbocharging stage, wherein the turbocharging stage comprises the compressor and the turbine, and the controller according to claim 8.

10. A motor vehicle comprising the internal combustion engine according to claim 9.

11. A method for controlling a turbocharginq system with a turbocharginq stage for an internal combustion engine, the turbocharginq stage comprising a compressor and a turbine adjustable via a VTG actuator, the method comprising:
    acquiring an operating state target variable; and
    adjusting a maximum VTG control criterion to implement a torque increase by increasing a boost pressure, wherein adjusting the maximum VTG control criterion comprises:
        determining a target boost pressure;
        determining a VTG target position as a function of the target boost pressure;
        determining an actual exhaust back pressure;
        determining a maximum exhaust back pressure; and
        determining the VTG control criterion taking into account a difference between the actual exhaust back pressure and the maximum exhaust back pressure, where the difference is determined by subtracting the actual exhaust back pressure from the maximum exhaust back pressure,
    wherein the VTG control criterion limits the VTG target position such that an accelerated adaptation of an actual boost pressure to the target boost pressure takes place compared with an adaptation of the actual boost pressure to the target boost pressure without consideration of the VTG control criterion,
    wherein the VTG control criterion is determined with consideration of a maximum exhaust back pressure change, and
    wherein the maximum exhaust back pressure change is determined from a parameterization of an operating state variable and the operating state target variable, the maximum exhaust back pressure change being weighted according to the difference between the actual exhaust back pressure and the maximum exhaust back pressure.

12. The method according to claim 11, wherein, for determining the maximum exhaust back pressure change a correction factor is taken into account, which is parameterized from the difference between the actual exhaust back pressure and the maximum exhaust back pressure.

13. The method according to claim 12, wherein the VTG control criterion is determined according to the following relationship:

$$u_{max} = \Delta u_{p3_{Ctl\ max}} + \Delta u_{p4} + \Delta u_T + \Delta u_{\dot{m}} + r_{Vtg}$$

with $$\Delta u_{p3_{Ctl\ max}} = \alpha \cdot \dot{p}_{3max} = \alpha \cdot K_p \cdot (p_{3max} - p_3)$$

-continued $$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \ddot{m}$$

and $$\alpha = \frac{\tau}{\left(\frac{\partial p_3}{\partial c_d} \cdot \frac{\partial c_d}{\partial r} + \frac{\partial p_3}{\partial A_{\textit{eff}}} \cdot \frac{\partial A_{\textit{eff}}}{\partial r}\right)}$$

wherein, $u_{max}$ is the maximum VTG control criterion, $\Delta u_{p3_{Cdmax}}$ is a control error driven part of $u_{max}$, $\Delta u_{p4}$ is a damping part of $u_{max}$ with respect to present $p_4$ variations, $\Delta u_T$ is a damping part of $u_{max}$ with respect to present temperature variations, $\Delta u_{\dot{m}}$ is a damping part of $u_{max}$ with respect to m variations, $r_{Vtg}$ is a VTG position, $\alpha$ is an inverted system gain from VTG position to $p_3$, $\dot{p}_{3max}$ is the maximum exhaust gas pressure change, $p_{3max}$ is the maximum exhaust gas pressure, $K_p$ is a gain, $p_3$ is the actual exhaust back pressure before a turbine, $\dot{p}_4$ is the actual exhaust back pressure after the turbine, $\dot{T}_3$ is a temperature before the turbine, $\dot{m}$ is a turbine mass flow, $\tau$ is an equivalent time constant of the VTG actuator, $c_d$ is a flow factor, r is a temporal control variable change, and $A_{\textit{eff}}$ is effective area.

14. The method according to claim 13, wherein the following variables are taken into account in the determination of the maximum exhaust back pressure via an output/input linearization which is realized by control technology: the temperature before the turbine, the actual exhaust back pressures, before and after the turbine, and/or the turbine mass flow.

\* \* \* \* \*